US008001416B2

(12) United States Patent
Leopold et al.

(10) Patent No.: US 8,001,416 B2
(45) Date of Patent: Aug. 16, 2011

(54) SYSTEM AND METHOD FOR RECOVERY OF INFORMATION STORED ON A CORRUPT STORAGE DEVICE

(75) Inventors: Perry Leopold, Round Rock, TX (US); John H. Dearlove, Sr., Harker Heights, TX (US); William Theobald, Newport Beach, CA (US); Dina Eldin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 806 days.

(21) Appl. No.: 12/045,904

(22) Filed: Mar. 11, 2008

(65) Prior Publication Data

US 2009/0235011 A1 Sep. 17, 2009

(51) Int. Cl.
*G06F 11/00* (2006.01)

(52) U.S. Cl. ........................................ 714/6.12

(58) Field of Classification Search .................. 714/2–8, 714/13, 15, 16, 20, 21, 25, 27, 37–39, 42, 714/54

See application file for complete search history.

(56) References Cited

U.S. PATENT DOCUMENTS

| | | | | |
|---|---|---|---|---|
| 6,360,232 | B1 * | 3/2002 | Brewer et al. | 1/1 |
| 6,757,848 | B2 * | 6/2004 | Bartlett | 714/42 |
| 6,785,786 | B1 * | 8/2004 | Gold et al. | 711/162 |
| 6,947,237 | B2 | 9/2005 | Christie, Jr. | |
| 6,954,834 | B2 * | 10/2005 | Slater et al. | 711/162 |
| 6,978,414 | B2 * | 12/2005 | Maple et al. | 714/771 |
| 2003/0014605 | A1 * | 1/2003 | Slater et al. | 711/162 |
| 2006/0218434 | A1 * | 9/2006 | Solhjell | 714/6 |
| 2007/0174678 | A1 * | 7/2007 | King | 714/8 |
| 2007/0174682 | A1 * | 7/2007 | King | 714/8 |

* cited by examiner

*Primary Examiner* — Nadeem Iqbal

(74) *Attorney, Agent, or Firm* — Hamilton & Terrile, LLP; Robert W. Holland

(57) ABSTRACT

A magnetic tape cartridge, such as a Linear Tape Open cartridge, stores parameters in a non-volatile memory, such as a Media Auxiliary Memory page of a Cartridge Memory, for use in reading and writing to a magnetic tape. A backup copy of the parameters is made in the non-volatile memory for use in reading and writing to the magnetic tape in the event that the primary copy of the parameters becomes corrupt. If a tape drive fails to retrieve the primary copy of the parameters, the tape drive looks for the backup copy at a predetermined memory location, such as location 200h in the Cartridge Memory.

20 Claims, 2 Drawing Sheets

SYSTEM AND METHOD FOR RECOVERY OF INFORMATION STORED ON A CORRUPT STORAGE DEVICE

BACKGROUND OF THE INVENTION

1. Field of the Invention

The present invention relates in general to the field of information handling system storage devices, and more particularly to a system and method for recovery of information stored on a corrupt storage device.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have proliferated through business and home use, the need to store information generated by the information handling systems has increased. As an example, businesses and homes often seek to back up information stored on information handling system hard disk drives (HDDs) so that stored information remains available in the event of a HDD failure. One common media used to back up stored information is the magnetic tape. Magnetic tapes have the ability to store large quantities of information in a removable media so that the end user can keep backed up information safely distant from the backed-up information handling systems. Industry has cooperated to create a standardized magnetic media storage solution known as the Linear Tape Open (LTO) Tape media so that magnetic tapes and tape drives manufactured by different companies interact properly. For example, LTO Tape media include a Cartridge Memory (CM) that interacts with a tape drive to aid in the use of information stored on the tape, such as for rapid location of data and trouble shooting. Non-volatile memory in the CM, such as flash memory, includes critical parameters in one or more Media Auxiliary Memory (MAM) pages that the tape drive reads and writes during storage operations. An RFID associated with the tape media provides a non-contacting RF interface to communicate information between the CM and the tape drive. The non-volatile memory in the CM also includes additional room to store other information.

One difficulty with LTO Tape media is that a corrupt CM that makes a critical parameter unreadable disables write operations to the tape. When an end user attempts to perform a write operation to a tape with a corrupt CM having unreadable critical data, the tape drive will present an error that the tape is read only. LTO Tape media are expensive, so losing the ability to write to a tape typically results in a frustrating customer experience. For example, end users often rotate through a series of tapes so that at the end of each business day a new back up tape is created that holds the information created for that day. If tape used in the rotation fails, the end user may not be able to back up information for that day until another tape is purchased. The inconvenience of purchasing another tape is minor by comparison if a failure of a storage device subsequently creates a need for a backed up copy of stored information.

SUMMARY OF THE INVENTION

Therefore a need has arisen for a system and method which provides multiple copies of critical parameters for use by a tape drive to write to a magnetic tape.

In accordance with the present invention, a system and method are provided which substantially reduce the disadvantages and problems associated with previous methods and systems for writing to a magnetic tape. Parameters stored in memory associated with a magnetic tape, such as non-volatile flash memory associated with a cartridge holding the magnetic tape, that support writes to the magnetic tape are backed up at a secondary location for reference in writing to the magnetic tape in the event that the primary parameters become corrupt.

More specifically, an information handling system interfaces with a tape drive to write information onto a magnetic tape held in a magnetic tape cartridge, such as an LTO cartridge having Cartridge Memory. A parameter module within firmware of the tape drive reads parameters from a primary parameter memory within the Cartridge Memory, such as defined Media Auxiliary Memory pages, and applies the parameters to perform writes on the magnetic tape. The parameter module determines if the parameters from the primary parameter memory are corrupt and, if so, reads a backup of the parameters from a secondary parameter memory, such as location 200h within the Cartridge Memory. Once the write operation is complete, the parameter module writes updated parameters to both the primary and secondary parameter memories so that multiple copies of the parameters are available to support subsequent writes to the magnetic tape.

The present invention provides a number of important technical advantages. One example of an important technical advantage is that corrupt non-volatile memory within a CM of an LTO tape media will not make the tape media unusable for accepting information writes. Backing up critical parameters needed for subsequent tape writes at different locations within the non-volatile memory ensures that critical parameters remain available even if the primary storage location becomes corrupt so that an end user may continue to perform writes to the tape media. The process of backing up critical parameters and using backed up critical parameters remains transparent to the end user unless otherwise notified of the problem. Since CM critical parameters are backed up to reduce tape failures, warranty costs to the manufacturer for replacing faulty tape cartridges are reduced.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Storing magnetic tape cartridge parameters in primary and secondary locations helps reduce the risk that the cartridge will fail when an information handling system attempts to write to the cartridge. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
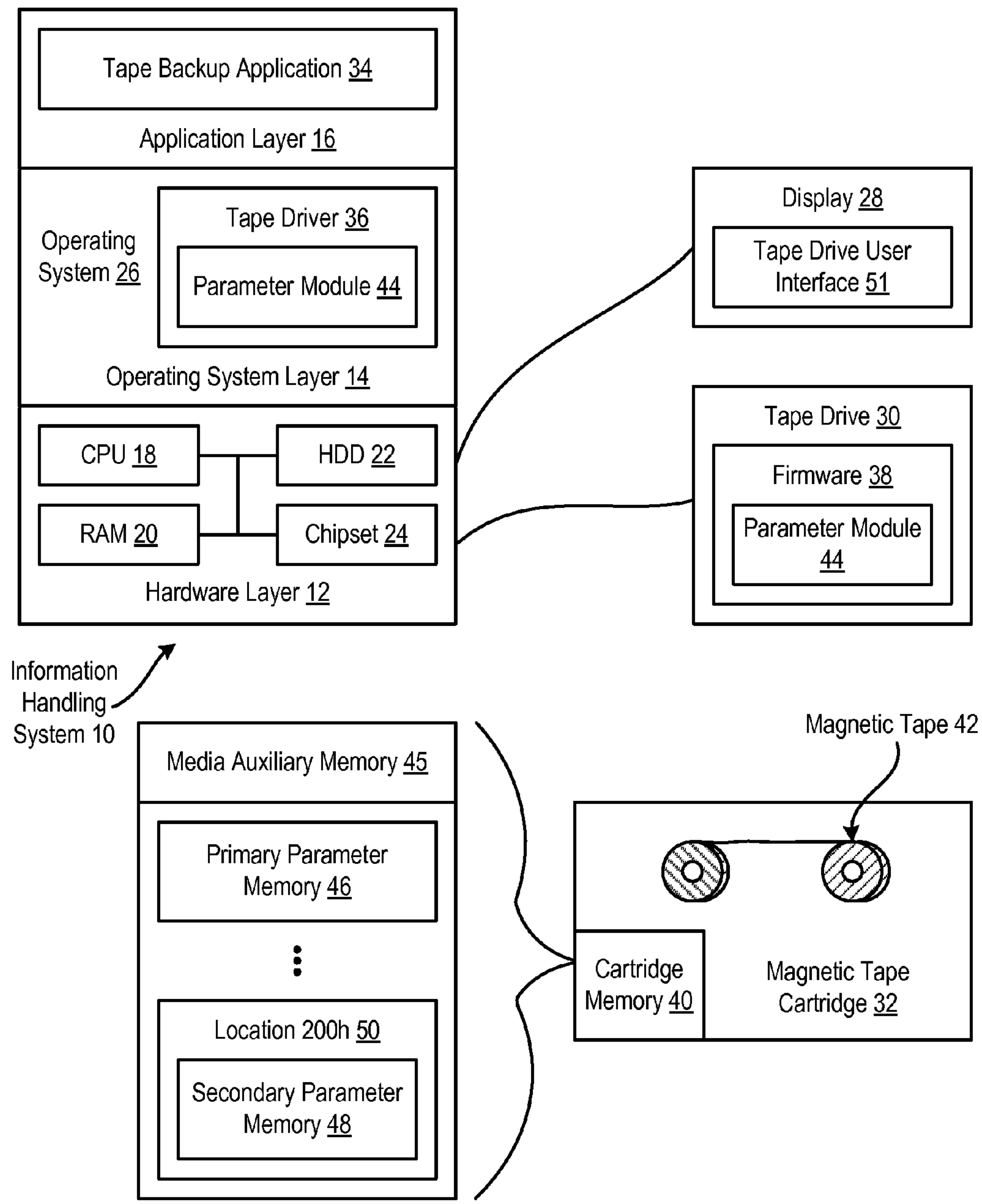
FIG. 1 depicts a block diagram of a magnetic tape storage system having primary and secondary memory locations for storing magnetic tape parameters.

Referring now to FIG. 1, a block diagram depicts a magnetic tape storage system having primary and secondary memory locations for storing magnetic tape parameters. An information handling system 10 generates information through the coordination of a hardware layer 12, an operating system layer 14 and an application layer 16. Hardware layer 12 includes a variety of processing parameters that interact to process information signals, such as a CPU 18, RAM 20, a hard disk drive 22 and a chipset 24. Operating system layer 14 includes an operating system 26 that coordinates the interaction of physical processing components and devices to support the running of applications by application layer 16. Information handling system 10 interfaces with external peripherals, such as a display 28 which presents information as visual images and a tape drive 30 which stores information on a magnetic tape cartridge 32. As an example, magnetic tape cartridge 32 is an LTO Tape media, although other types of media that store parameters in memory, such as non-volatile memory, may also be used. In operation, information handling system 10 stores information on magnetic tape cartridge 32 through a tape backup application 34 which interacts with tape drive 30 through a tape driver 36 of operating system 26. Firmware 38 in tape drive 30 reads non-volatile Cartridge Memory 40 to retrieve parameters used to support writes to magnetic tape 42. If the parameters are not available from Cartridge Memory 40, then tape drive 30 treats magnetic tape cartridge 32 as read-only.

In order to reduce the risk that tape drive 30 will treat magnetic tape cartridge 32 as read only, a parameter module 44 stores a backup copy of parameters used to write to magnetic tape 42. For example, under the LTO standard, after writes to magnetic tape 42, parameter module 44 stores parameters associated with the writes to a predetermined Media Auxiliary Memory 45 page to provide for rapid location of information on magnetic tape 42 during subsequent reads and writes. In addition to this primary parameter memory 46, parameter module 44 stores a backup copy of the parameters in a secondary parameter memory 48, such as in location 200h within Cartridge Memory 40. At subsequent writes, parameter module 44 first looks for the parameters in primary parameter memory 46 and, if the parameters in primary parameter memory 46 are corrupt, looks for the parameters in secondary parameter memory 48. After a write to magnetic tape 42, parameter module 44 updates the parameters in both the primary parameter memory 46 and the secondary parameter memory 48. If the write to primary parameter memory 46 is successful, then subsequent writes can use primary parameter memory 46 as normal. If the write to primary parameter memory 46 is unsuccessful, then subsequent writes can use secondary parameter memory 48 to perform writes to magnetic tape 42 in a manner that is transparent to the end user. In alternative embodiments, the end user is provided with notification of degraded operations through a user interface 51 at display 28. In one alternative embodiment, parameter module 44 stores parameters in a secondary parameter memory within local memory of tape drive 30. In such an instance, a notification to an end user can let the end user know that the magnetic tape cartridge 32 will write only in the current tape drive. In another alternative embodiment, a parameter module 44 associated with tape driver 36 stores parameters in a secondary parameter memory within information handling system 10 so that the magnetic tape cartridge 32 may be used on tape drives 30 that interface with information handling system 10.

Figure 2:
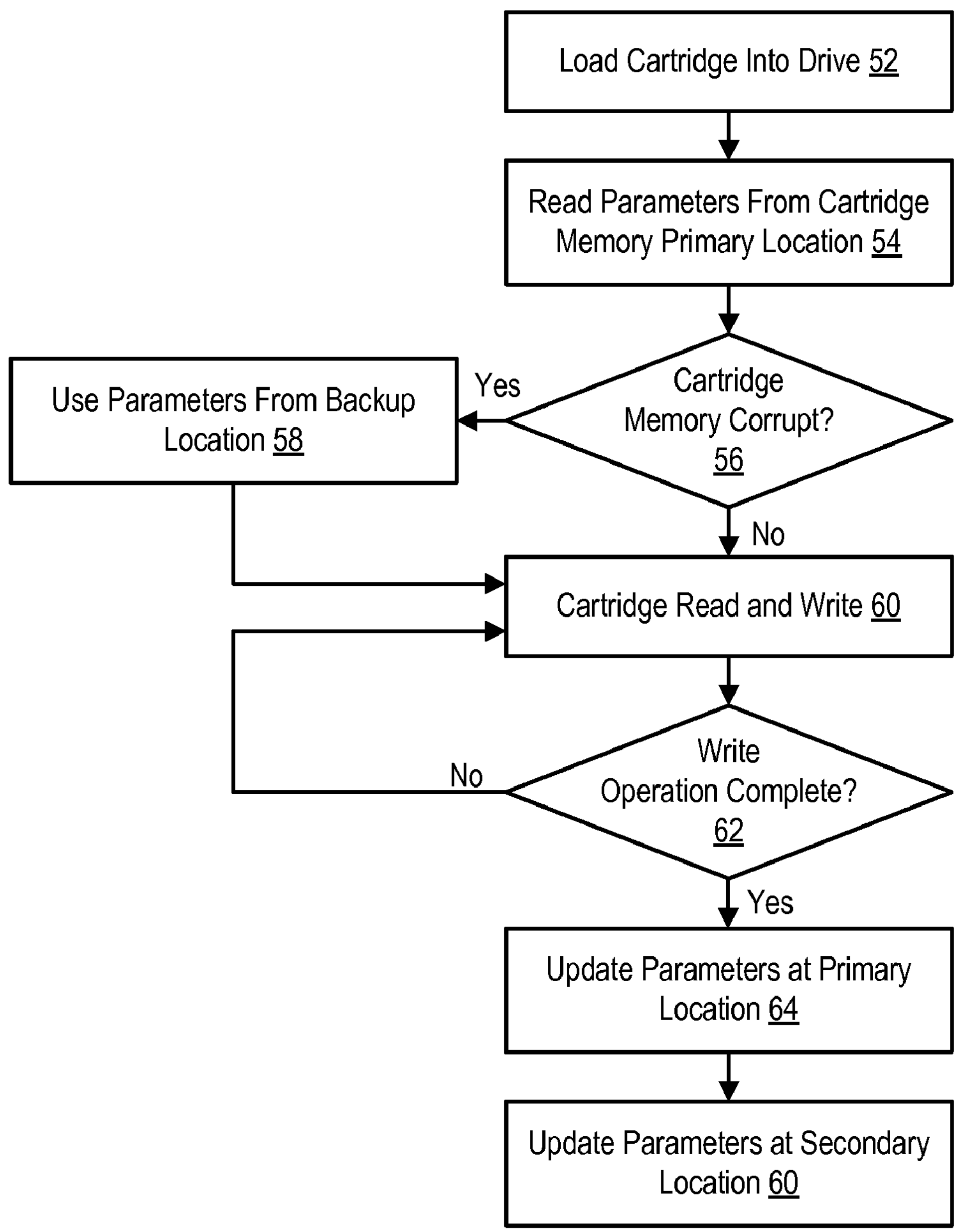
FIG. 2 depicts a flow diagram of a process for storing and retrieving magnetic tape parameters from primary and secondary memory locations.

Referring now to FIG. 2, a flow diagram depicts a process for storing and retrieving magnetic tape parameters from primary and secondary memory locations. The process begins at step 52 with insertion of a magnetic tape cartridge into a tape drive. At step 54, the tape drive attempts to retrieve from memory, such as non-volatile memory, the parameters stored on the magnetic tape cartridge at previous writes. For example, with LTO compliant tapes, parameters are read from defined Media Auxiliary Memory pages within a Cartridge Memory. At step 56, a determination is made of whether the parameters in the Cartridge Memory are corrupt. If the parameters are corrupt, the process continues to step 58 to use parameters retrieved from a backup location. If the parameters are not corrupt or if the backup parameters are used, the process continues to step 60 to apply the parameters to read and write the magnetic tape. At step 62, if a write operation is not complete, the process returns to step 60 to continue reads and writes. If the write operation is complete, the process continues to step 64 to update the parameters at the primary location within the Cartridge Memory so that the parameters reflect the latest write operation. At step 66, the process continues to update the parameters in a secondary location within the Cartridge Memory so that a backup exists with which subsequent writes may be performed in the event that the primary copy of the updated parameters becomes corrupt.

Although the present invention has been described in detail, it should be understood that various changes, substitutions and alterations can be made hereto without departing from the spirit and scope of the invention as defined by the appended claims.

What is claimed is:

1. A magnetic tape cartridge comprising:

magnetic tape operable to accept information from a tape drive;

primary memory separate from the magnetic tape and operable to store predetermined parameters readable by the tape drive, the predetermined parameters used by the tape drive to support writing information to the magnetic tape; and backup memory separate from the magnetic tape and operable to store a back up of the predetermined parameters for use by the tape drive to support writing information to the magnetic tape in the event of corruption of the predetermined parameters stored in the primary memory.

2. The magnetic tape cartridge of claim 1 wherein the primary memory comprises a Cartridge Memory.

3. The magnetic tape cartridge of claim 2 wherein the Cartridge Memory comprises one or more Media Auxiliary Memory pages that store the predetermined parameters.

4. The magnetic tape cartridge of claim 2 wherein the backup memory comprises a predetermined location in non-volatile memory of the cartridge.

5. The magnetic tape cartridge of claim 4 wherein the predetermined location in non-volatile memory comprises location 200 h.

6. The magnetic tape cartridge of claim 1 wherein the backup memory comprises memory located on the tape drive.

7. The magnetic tape cartridge of claim 1 wherein the backup memory comprises memory located on an information handling system interfaced with the tape drive.

8. The magnetic tape cartridge of claim 1 further comprising instructions running on the tape drive operable to read the predetermined parameters from the non-volatile memory, to recognize the predetermined parameters as corrupt, and to read the predetermined parameters from the backup memory.

9. A method for storing information to a magnetic tape cartridge having a magnetic tape, the method comprising:

storing predetermined parameters in a primary memory of the magnetic tape cartridge, the predetermined parameters associated with performance of a write on the magnetic tape, the primary memory separate from the magnetic tape; and storing the predetermined parameters in a backup memory for use if the primary memory becomes corrupt, the backup memory separate from the magnetic tape.

10. The method of claim 9 further comprising:

attempting to retrieve the predetermined parameters to perform a write on the magnetic tape;

determining the predetermined parameters are not retrievable; and retrieving the predetermined parameters from the backup memory.

11. The method of claim 10 further comprising writing to the magnetic tape with the predetermined parameters retrieved from the backup memory.

12. The method of claim 9 wherein the magnetic tape cartridge comprises a Linear Tape Open Tape media and the primary memory comprises one or more Media Auxiliary Memory pages.

13. The method of claim 9 wherein the magnetic tape cartridge comprises a Linear Tape Open Tape media and storing the predetermined parameters in backup memory further comprises storing the predetermined parameters at location 200 h of a Cartridge Memory.

14. The method of claim 9 wherein storing the predetermined parameters in backup memory comprises storing the predetermined parameters on a tape drive.

15. The method of claim 9 wherein storing the predetermined parameters in backup memory comprises storing the predetermined parameters on an information handling system interfaced with a tape drive, the tape drive interacting with the magnetic tape cartridge.

16. An information handling system comprising:

plural processing components operable to process information;

a tape drive interfaced with the processing components and operable to write information to a magnetic tape cartridge and to read information from the magnetic tape cartridge;

a magnetic tape cartridge installed in the tape drive, the magnetic tape cartridge having a magnetic tape operable to store information and a non-volatile memory separate from the magnetic tape and operable to store parameters for use by the tape drive; and a parameter module interfaced with the non-volatile memory, the parameter module operable to store the parameters in a primary location of the non-volatile memory and a backup location of the non-volatile memory.

17. The information handling system of claim 16 wherein the parameter module is further operable to read the parameters from the primary location, to determine the parameters are corrupt, to read the parameters from the backup location and to provide the parameters read from the secondary location to the tape drive for use in writing to the magnetic tape.

18. The information handling system of claim 16 wherein the non-volatile memory comprises a Cartridge Memory.

19. The information handling system of claim 16 wherein the primary location comprises a Media Auxiliary Memory.

20. The information handling system of claim 16 wherein the backup location comprises location 200 h in a Cartridge Memory.

* * * * *